United States Patent
Keshavaraj

(10) Patent No.: US 6,715,791 B2
(45) Date of Patent: Apr. 6, 2004

(54) AIR BAG TETHER SYSTEM COMPRISING MULTIPLE SEGMENTS CUT IN ALIGNMENT WITH FABRIC WARP OF FILL

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 101 days.

(21) Appl. No.: 09/828,081

(22) Filed: Apr. 6, 2001

(65) Prior Publication Data

US 2002/0146949 A1 Oct. 10, 2002

(51) Int. Cl.[7] .............................................. B60R 21/16
(52) U.S. Cl. .................... 280/743.2; 442/208; 442/203; 139/387 R; 139/384; 428/101; 428/116; 428/166; 244/172; 244/158 R; 244/164; 244/150
(58) Field of Search ...................... 442/208; 280/743.2

(56) References Cited

U.S. PATENT DOCUMENTS

| | | | |
|---|---|---|---|
| 4,966,389 A | 10/1990 | Takada | 280/743 |
| 5,308,113 A | 5/1994 | Moriset | 280/743 A |
| 5,613,708 A | 3/1997 | Bleider et al. | 280/743.2 |
| 5,669,632 A * | 9/1997 | Johnson et al. | 280/743.2 |
| 5,813,696 A | 9/1998 | Hill | 280/743.2 |
| 5,848,805 A | 12/1998 | Sogi et al. | 280/743.2 |
| 5,997,037 A | 12/1999 | Hill et al. | 280/743.2 |
| 6,059,312 A | 5/2000 | Staub et al. | 280/729 |
| 6,086,096 A | 7/2000 | Link et al. | 280/743.2 |
| 6,241,283 B1 | 6/2001 | Zarazua | 280/743.2 |
| 6,254,130 B1 | 7/2001 | Jayaraman et al. | 280/743.2 |
| 6,302,433 B1 | 10/2001 | Ellerbrok et al. | 280/729 |
| 6,315,324 B1 | 11/2001 | Keshavaraj | 280/743.2 |
| 2002/0027353 A1 | 3/2002 | Keshavaraj | 280/743.2 |

FOREIGN PATENT DOCUMENTS

| | | |
|---|---|---|
| EP | 0 611 683 | 8/1994 |
| GB | 2 243 119 | 3/1990 |

* cited by examiner

Primary Examiner—Arti Singh
(74) Attorney, Agent, or Firm—Terry T. Moyer; Charlotte C. Wilson

(57) ABSTRACT

The present invention relates to multi-segment air bag tether panels and to a pattern-wise arrangement of such tether segments in relation to air bag panels on a fabric blank. In one embodiment, the tether panel is comprised of two or more tether segments that are cut in substantial alignment with the warp or the fill of the fabric blank. The tether panels are then connected to one another along their tether-attachment ends to form a functional tether system. This multiple-segment construction decreases the amount of fabric that is used in the manufacture of the air bag and tethers, while providing sufficient elongation for the tether system to be functional.

13 Claims, 4 Drawing Sheets

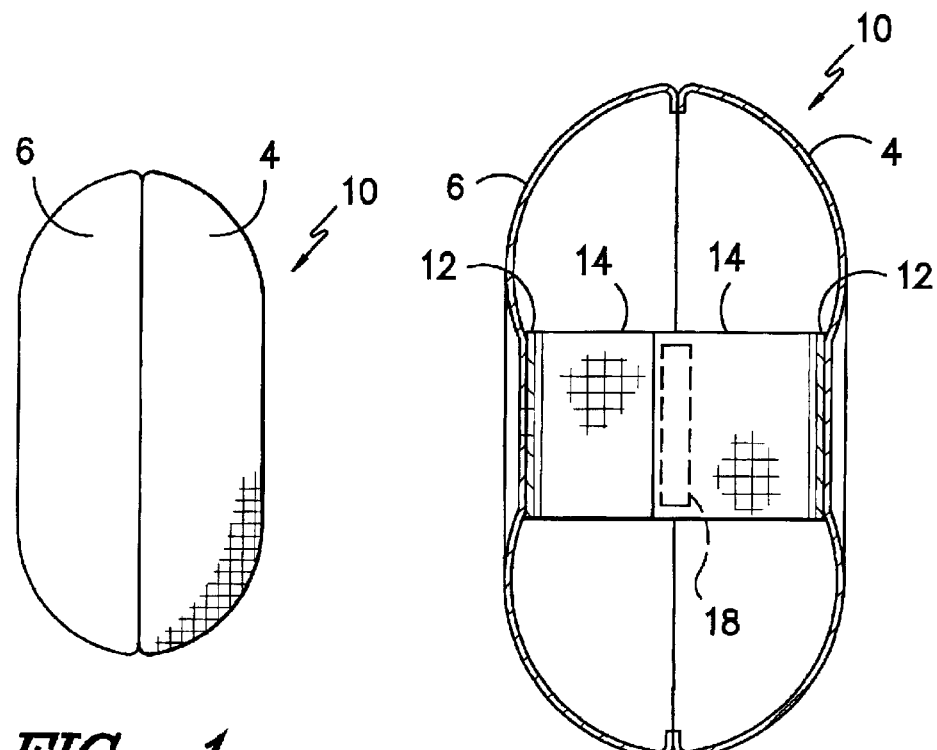
FIG. -1-
FIG. -2-
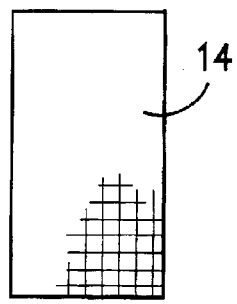
FIG. -3A-
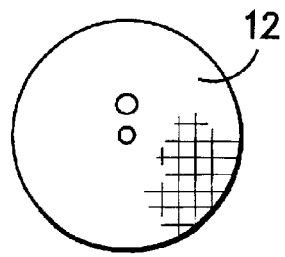
FIG. -3B-

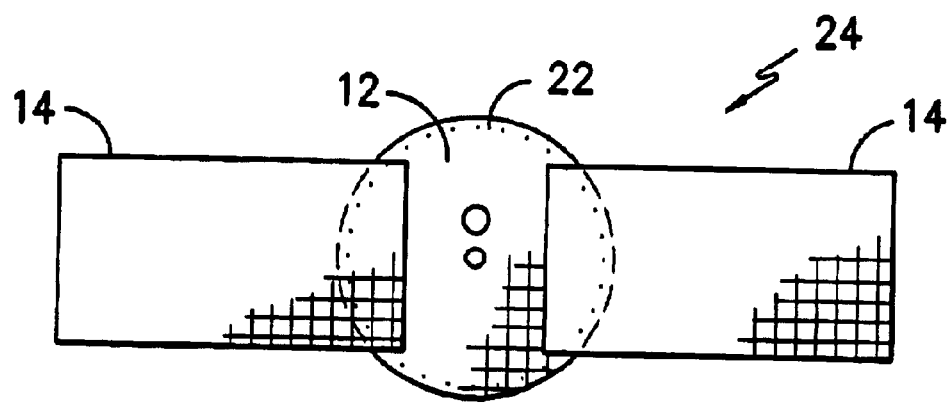
FIG. -3C-
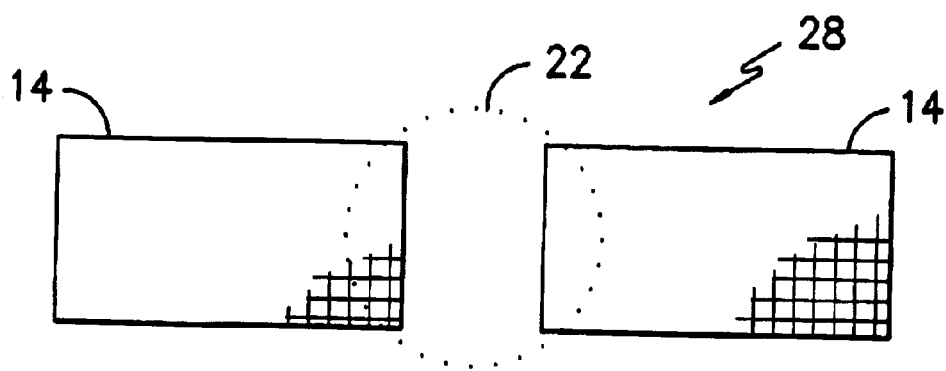
FIG. -3D-

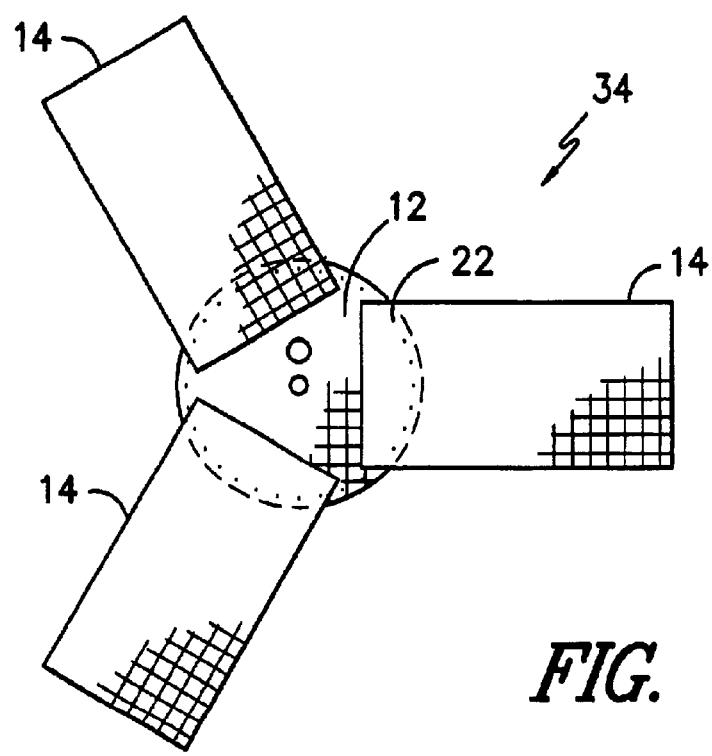
FIG. -4-
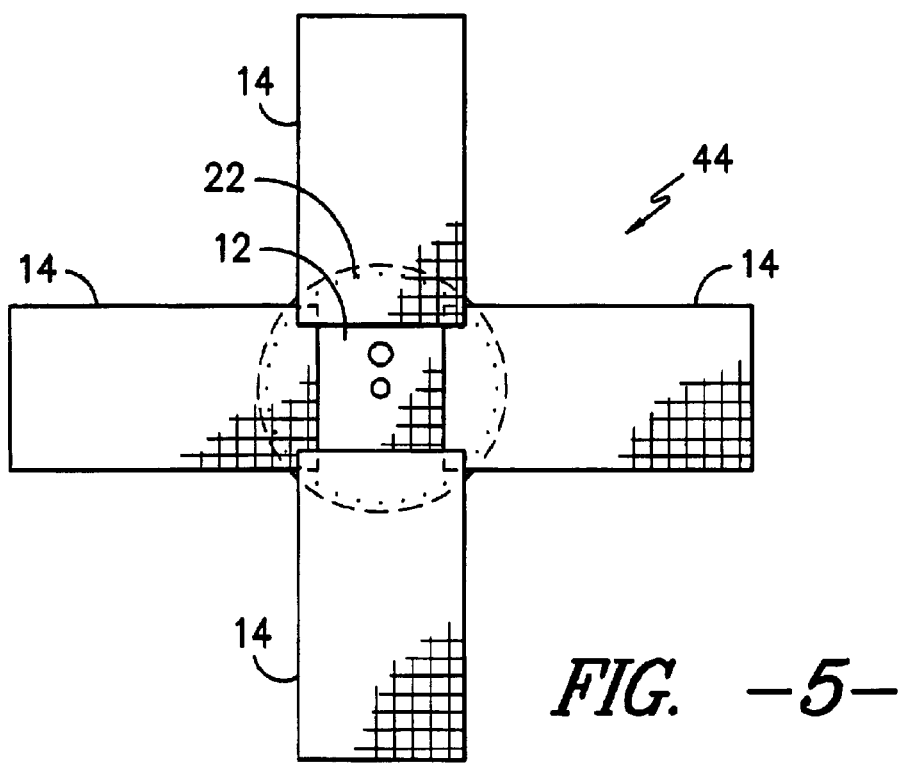
FIG. -5-

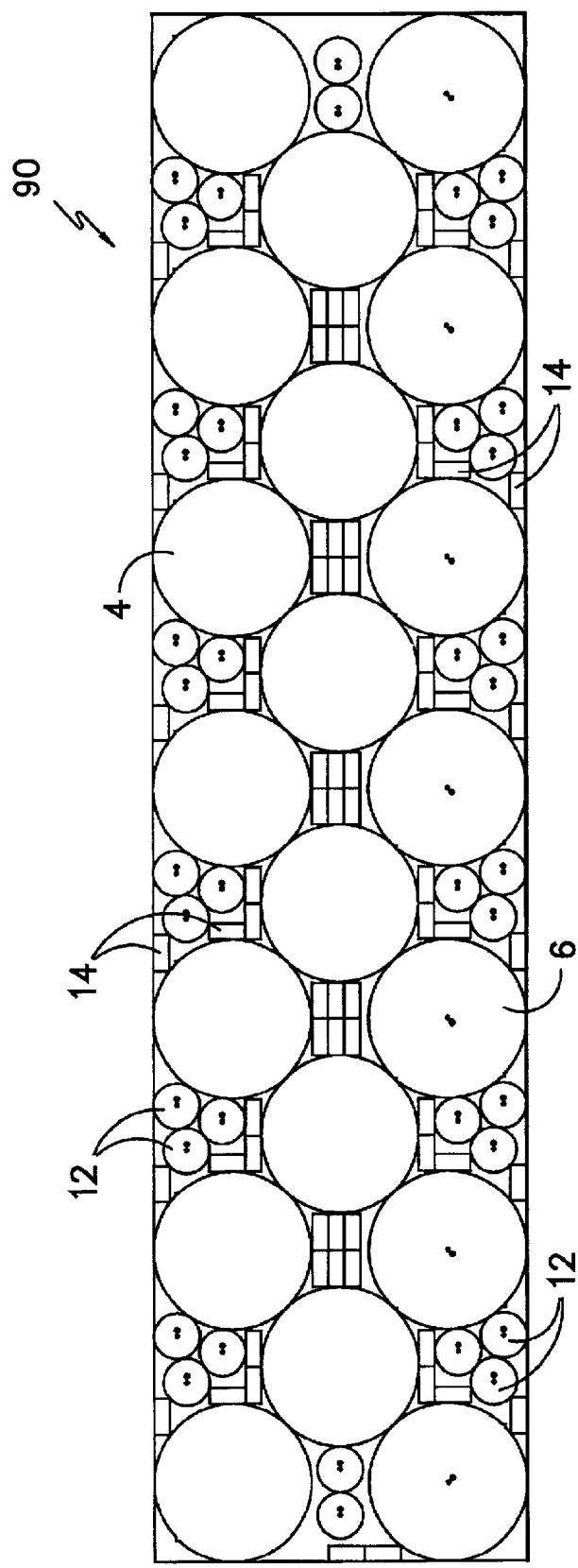
FIG. -6-

US 6,715,791 B2

AIR BAG TETHER SYSTEM COMPRISING MULTIPLE SEGMENTS CUT IN ALIGNMENT WITH FABRIC WARP OF FILL

TECHNICAL FIELD

This disclosure relates to air bag tethers and to a pattern-wise arrangement of tether components in relation to air bag panels on a fabric blank, thus resulting in increased fabric utilization and an overall cost savings per finished air bag. The air bag tether system as described herein is comprised of two congruent multi-segment tether panels that are joined to one another and to a respective air bag panel. Unlike conventional tether systems, the segments that comprise the tether panels are cut in alignment with the warp and the fill of the fabric blank. This multi-segment construction, with its segments cut along the primary load-bearing axis of the fabric, decreases the amount of fabric that is used in the manufacture of the air bag and tethers, while providing sufficient elongation for the tether system to be functional.

BACKGROUND

Traditionally, air bag tethers have been used to control the excursion of an air bag as it inflates. As gas is released, causing the air bag to rapidly inflate, it is necessary to keep such inflation from occurring in an uncontrolled manner. Tethers, which are sewn to the front and rear panels of an air bag, keep the inflating air bag from expanding so rapidly as to adversely affect the safety of the vehicle occupant, as the vehicle occupant contacts the air bag.

Tethers are conventionally strip-shaped pieces of fabric that are aligned in pattern-wise arrangement on a fabric blank, or that are aligned in relation to air bag panels that may be cut from the same blank. The patterns for these tethers may include a circular portion in the center area of the tether strip around which the strip is attached to the air bag panel. This circular portion makes it difficult to efficiently nest a number of tethers with one another on a fabric blank.

It is understood in the industry that such tethers should have a capacity for elongation (that is, the tethers should be able to stretch to accommodate the rapid excursion of the bag). For this reason, conventional tethers have been cut on the bias with respect to the warp and fill of the fabric. However, aligning the tether patterns to meet the criterion of bias-cutting increases the amount of fabric needed to create an appropriate number of tethers for a plurality of air bags. Furthermore, because fabric utilization comprises more than fifty percent of the costs of a finished air bag, aligning the tethers in this manner increases production costs.

SUMMARY

The present air bag tether system addresses the problems of fabric utilization and tether elongation. Instead of the tether panels being cut on the bias, the tether panels are cut in alignment with the primary load-bearing axis of the fabric (i.e., the warp or the fill). Using a multi-segment tether system in which none of the tether panels are cut on the bias increases fabric utilization by allowing the tether segments to be arranged around air bag panels into spaces that would otherwise be considered fabric waste. The utilization of alignment-cut tether segments leads to improved fabric utilization, while providing a tether system that is capable of sustaining the forces exerted by the inflating air bag.

BRIEF DESCRIPTION OF THE DRAWINGS

FIG. 1 shows a side view of an air bag comprised of a front bag panel and a rear bag panel;

FIG. 2 shows a cross-sectional view of the air bag of FIG. 1, revealing a tether system incorporated therein;

FIG. 3A shows a plan view of one tether segment of the present invention that is cut in alignment with the warp and fill of a fabric blank;

FIG. 3B shows a plan view of a circular reinforcement as may be included in the air bag tether system of the present invention;

FIG. 3C shows a plan view of a multi-segment tether panel, as comprised of two of the tether segments of FIG. 3A and the circular reinforcement of FIG. 3B, which would be attached to both the face and rear bag panels of the air bag of FIG. 1;

FIG. 3D shows a plan view of a multi-segment tether, in which two of the tether segments of FIG. 3A are attached to either the face or rear panel of an air bag by a circular seam, but without the inclusion of the circular reinforcement of FIG. 3B;

FIG. 4 shows a plan view of a multi-segment tether that is comprised of three of the tether segments of FIG. 3A and the circular reinforcement of FIG. 3B;

FIG. 5 shows a plan view of a multi-segment tether that is comprised of four of the tether segments of FIG. 3A and the circular reinforcement of FIG. 3B; and FIG. 6 shows a plan view of the arrangement of air bag panel components and the tether components of FIGS. 3A and 3B on a fabric blank, in accordance with the teachings herein.

DETAILED DESCRIPTION

In order to describe the invention, it is necessary that certain terms be defined. The term "bias" is intended to refer to a cut diagonally across the weave of a fabric, usually at an angle of 25 to 65 degrees with respect to the warp and fill. The term "substantial alignment" shall be used to describe a cut made at an angle less than 25 degrees from the warp or fill of the fabric, and, more preferably, in direct alignment with the warp or fill of the fabric.

The term "tether segment" is used to describe a unit of fabric having a length greater than its width, and, more preferably, a substantially rectangular piece of fabric, that is used in the creation of a tether panel. For simplicity, a rectangle will be used in the drawings to represent these segments. The present invention relates to tether segments that are cut in substantially alignment with either the warp or fill of the fabric. The term "tether panel" shall refer to one of two components of a tether system; each of the tether panels is comprised of two or more tether segments positioned on the same bag panel, either with or without a central reinforcement, as will be described herein. The term "tether system" shall refer to joined tether panels utilized to prevent the uncontrolled excursion of an inflating air bag from adversely affecting a vehicle occupant with whom such a bag comes into contact. Tether systems generally employ two tether panels for each finished air bag, and, as shall be described herein, each tether panel of the present invention comprises two to four tether segments.

The term "front" shall refer to that portion of an air bag that is nearest a vehicle occupant, while the term "rear" shall refer to those portions of an air bag that are furthest from the vehicle occupant (e.g., in the case of front-seat air bags, nearest the windshield). The term "bag panel" shall be used to describe one of the fabric panels used to create a finished air bag. The term "central attachment region" shall refer to that area of the bag panel around which the tether segments are radially positioned. The axis of radial symmetry of the inflated air bag is located within the central attachment region.

Because of the speed with which an air bag inflates, it is necessary for the protection of vehicle occupants to control the volume of space that the air bag occupies in the vehicle cabin. Tethers accomplish this task by preventing the uncontrolled expansion of the air bag. Tethers are securely connected to the interior portions of the air bag, usually by sewing, welding, gluing, or other joining techniques.

FIG. 1 shows a side view of an air bag 10. Air bag 10 is comprised of a front bag panel 4 and a rear bag panel 6, bag panels 4 and 6 being substantially circular, although other panel geometries could also be used. For example only, and not meant as limitation, bag panels 4 and 6 having the shape of a regular n-sided polygon could also be used. As is standard within the industry for this type of simple air bag, bag panels 4 and 6 should have the same geometry.

FIG. 2 shows a cross-sectional view of air bag 10, revealing the arrangement of a tether system therein. Tether segments 14 (shown in FIG. 3A as being cut in substantial alignment with the warp or fill of a fabric blank) are attached to front bag panel 4 and rear bag panel 6. The end of each tether segment 14 that is attached to a bag panel (4 or 6) shall be known as the bag-attachment end. Tether segments 14 are shown in lapped fashion with one another in the interior of air bag 10. The end of each tether segment 14 that is attached to another tether segment 14 shall be known as the tether-attachment end. The joining of tether segments 14 (at their respective tether-attachment ends) is shown as being achieved by means of seam 18, but such joining may be accomplished by any other means, such as welding, gluing, or other attachment techniques. In one embodiment, tether segments 14 are substantially rectangular in shape, although any segments having a greater length than width may be used, including tether segments 14 with flared or arc-shaped bag-attachment ends.

In one embodiment, at least one central region reinforcement 12 (shown in FIG. 3B) is also attached to front bag panel 4, as well as rear bag panel 6. It is common for reinforcements, having a circular or other shape, to be used in the production of air bags 10. One or more central region reinforcements 12 are included with tether segments 14 to form tether panel 24 (as shown in FIG. 3C). Such reinforcements 12 are particularly important in preventing tears around the mouth of air bag 10, at the location of the inflation media. For that reason, up to five reinforcements 12 may be desirable for attachment to rear bag panel 6. In other circumstances, such as when cool-temperature inflation media are used, no reinforcements 12 may be needed.

Tether segment 14 is part of a multi-segment tether panel 24 that is shown in FIG. 3C. In one embodiment, tether panel 24 is comprised of at least two of tether segments 14 and at least one central region reinforcement 12. Central region reinforcement 12 is positioned in the central attachment region of bag panel 4. Tether segments 14 are positioned radially about the central attachment region of bag panel 4 and are secured at their respective bag-attachment ends to reinforcement 12 and to bag panel 4 by seam 22, as indicated by a dotted line in FIG. 3C. Similarly, tether segments 14 and reinforcement 12 are attached to rear bag panel 6. The tether-attachment ends of tether segments 14 attached to front bag panel 4 are joined to the tether-attachment ends of tether segments 14 that are attached to rear bag panel 6 by seaming, welding, gluing, or other attachment means as are known in the art.

FIG. 3D shows a variation of tether panel 24. In this embodiment, central region reinforcement 12 is omitted. Tether segments 14 are positioned radially about the central attachment region of bag panel 4 or 6 and are then attached to bag panel 4 or 6 by means of seam 22. As described previously, other attachment means including welding or gluing could also be employed. In this embodiment, although tether segments 14 do not directly contact one another, tether segments 14 nevertheless act in cooperation with one another and with bag panel 4 or 6 to which they are attached (not shown) to form tether panel 28.

Turning now to FIG. 4, a three-legged tether panel 34 is shown. Three-legged tether panel 34 is comprised of three tether segments 14 and at least one central region reinforcement 12 that is positioned in the central attachment region of bag panel 4 or 6. Tether segments 14 are positioned radially about the central attachment region of bag panel 4 or 6 and are secured at their respective bag-attachment ends to reinforcement 12 and to bag panel 4 or 6 by seam 22. Three-legged tether panels 34 are useful for reducing bag oscillation during deployment.

FIG. 5 shows a four-legged tether panel 44. Four-legged tether panel 44 is comprised of at least one central region reinforcement 12 that is positioned in the central attachment region of bag panel 4 or 6 and four tether segments 14 positioned radially about the central attachment region of bag panel 4 or 6. Seam 22 secures tether segments 14 and reinforcement 12 to bag panel 4 or 6, although other attachment means could also be used. Four-legged tether panels 44 are even more capable of reducing oscillation during bag deployment.

FIG. 6 illustrates an arrangement on a fabric blank 90 of air bag panels 4 and 6, tether segments 14, and central region reinforcements 12. By way of example only, bag panels 4, 6 having a circular shape are illustrated. The separation of the conventional tether into multiple tether segments 14 allows a greater number of air bag components to be produced from a smaller length of fabric, by nesting tether segments 14 between bag panels 4, 6 into areas that would otherwise be considered fabric waste. Further, because the tether panels 14 are cut in substantial alignment with the warp or fill of fabric blank 90, the amount of fabric utilized per finished air bag 10 and the amount of fabric waste is decreased significantly. This statement applies to tether panels 34 and 44 as well.

The multi-segment tether system of the present invention includes a pair of tether panels 24 (or 28, 34, or 44) whose individual tether segments 14 are cut in substantial alignment with the warp or fill of fabric blank 90. Each tether panel 24 is comprised of multiple tether segments 14 and may or may not include central region reinforcements 12. By incorporating these various multi-segment tether systems, the present invention addresses the issues of fabric utilization and cost, thus representing a useful advancement over the prior art.

I claim:

1. A bag panel, said bag panel having an axis of radial symmetry, said axis of radial symmetry being located within a central attachment region of said bag panel, said bag panel further having a tether system comprising at least two tether segments arranged radially about said central attachment region in a configuration having at least one axis of symmetry that is perpendicular to said axis of radial symmetry of said bag panel; wherein said tether segments are cut from a textile fabric, said textile fabric constructed of a group of warp yarns and a group of fill yarns, said tether segments being cut in substantial alignment with one of said groups of yarns, and wherein arcuate portions of a circular seam secure an end portion of each of said tether segments to said bag panel, said circular seam being located along the boundary of the central attachment region of said bag panel.

2. The bag panel of claim 1 wherein said axis of radial symmetry passes through the center of said central attachment region.

3. The bag panel of claim 1 wherein said central attachment region associated with said bag panel contains a reinforcement attached to said bag panel and said tether segments by said circular seam.

4. The bag panel of claim 1 wherein said tether segments are substantially rectangular in shape.

5. The bag panel of claim 4 wherein said tether segments are substantially congruent.

6. The bag panel of claim 1 wherein said tether system is comprised of three of said tether segments.

7. The bag panel of claim 6 wherein said tether system is comprised of three tether segments and at least one reinforcement attached to said tether segments.

8. The bag panel of claim 1 wherein said tether system is comprised of four of said tether segments.

9. The bag panel of claim 8 wherein said bag panel is comprised of four tether segments and at least one reinforcement attached to said tether segments.

10. An air bag comprising a first bag panel and a second bag panel, said first bag panel having a first tether system attached thereto, said first tether system comprising at least two tether segments, and said second bag panel having a second tether system attached thereto, said second tether system comprising a number of tether segments that is equal to that of said first tether system, and wherein each of said bag panels has a central attachment region around which said tether segments are radially positioned, each of said tether segments having a first end portion that is attached to a respective bag panel by an arcuate portion of a circular seam sewn around said central attachment region of said bag panel and having a second end portion that is attached to the second end portion of a corresponding tether segment whose first end portion is attached to an opposing bag panel, each of said tether segments being cut from a textile fabric having a warp and a fill, each of said tether segments being cut in alignment with the warp or the fill.

11. The air bag of claim 10, wherein each of said first and said second tether systems has three tether segments.

12. The air bag of claim 10, wherein each of said first and said second tether systems has four tether segments.

13. The air bag of claim 10, wherein at least one of said tether systems further comprises a reinforcement that is positioned in said central attachment region and that is secured to said tether segments and to said bag panel by said circular seam.

* * * * *